United States Patent

[11] 3,604,450

[72] Inventor Lawrence A. Botkin
    Omaha, Nebr.
[21] Appl. No. 792,294
[22] Filed Jan. 21, 1969
[45] Patented Sept. 14, 1971
[73] Assignee Fruehauf Corporation
    Detroit, Mich.

[54] VALVE CONSTRUCTION
    8 Claims, 4 Drawing Figs.

[52] U.S. Cl. .................................................. 137/493.4,
                                                        137/543.17
[51] Int. Cl. .................................................. F16k 17/18
[50] Field of Search .......................................... 137/493.4,
        493.6, 493.8, 493.9, 543.17, 541, 540, 469, 471,
                              493, 493.1, 493.2, 493.3, 493.5

[56] References Cited
    UNITED STATES PATENTS

| | | | |
|---|---|---|---|
| 1,760,391 | 5/1930 | Williams et al. | 251/122 |
| 2,724,406 | 11/1955 | Murray | 137/491 |
| 3,155,366 | 11/1964 | Rasmussen | 137/490 X |
| 432,140 | 7/1890 | Kilborn | 137/469 |
| 2,072,271 | 3/1937 | Meadows | 137/541 |
| 2,162,743 | 6/1939 | Norbom | 137/493.4 |
| 2,320,339 | 6/1943 | Buttner | 137/540 X |
| 2,547,862 | 4/1951 | Gilmore | 137/469 X |
| 2,583,169 | 1/1952 | Funkhouser | 137/493.5 |
| 2,601,563 | 6/1952 | Selwyn | 137/540 |
| 2,691,387 | 10/1954 | Strauss | 137/541 X |
| 2,869,569 | 1/1959 | Kimmell | 137/469 X |

FOREIGN PATENTS

| | | | |
|---|---|---|---|
| D.17,613 | 12/1955 | Germany | 137/493.5 |
| 829,931 | 3/1960 | Great Britain | 137/541 |
| 497,472 | 12/1938 | Great Britain | 137/540 |

*Primary Examiner*—M. Cary Nelson
*Assistant Examiner*—Robert J. Miller
*Attorney*—Snyder & Butrum ABSTRACT: A valve seat means defines an opening for receiving a valve means and has a seating surface formed thereon. A chamfer is formed on the valve seat means between the opening and seating surface thereof. A valve means includes a sealing surface for engaging the seating surface of the valve means, and a spring means engages the valve means to urge the surfaces into sealing engagement. The valve means includes a poppet portion having a tapered surface which is in communication with a substantially straight cylindrical shoulder. This shoulder fits relatively closely within the opening in the valve seat means and is disposed adjacent the chamfer on the valve seat means. The shoulder on the valve means has a greater dimension in a direction extending substantially parallel with the direction of movement of the valve means than does the chamfer on the valve seat means.

PATENTED SEP 14 1971
3,604,450
SHEET 1 OF 2
FIG. 1
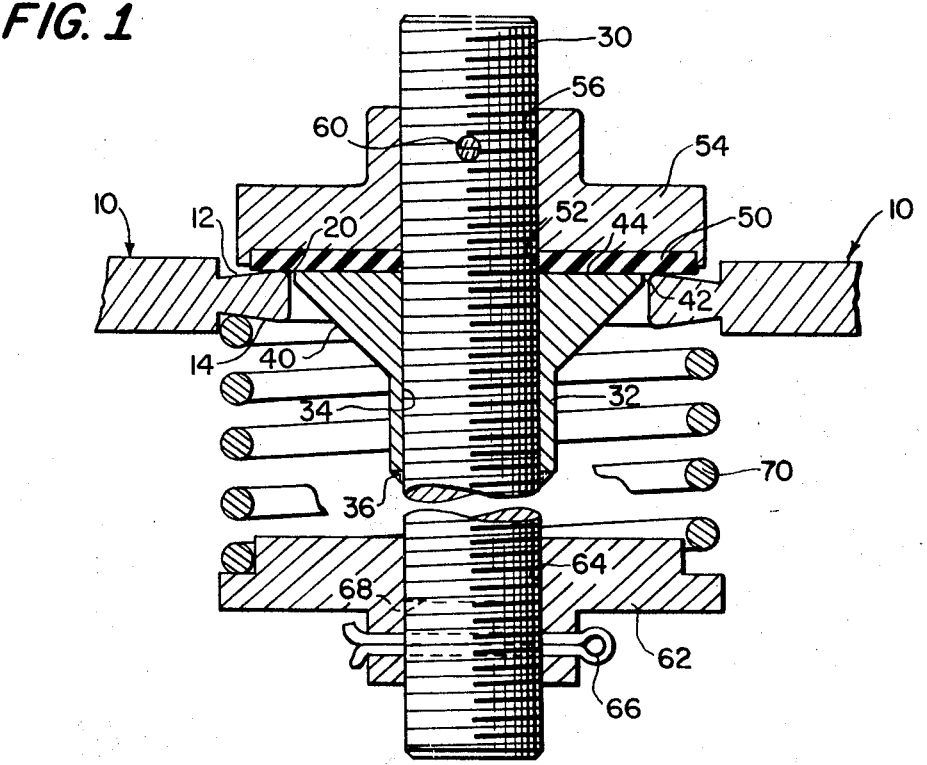
FIG. 3
FIG. 2
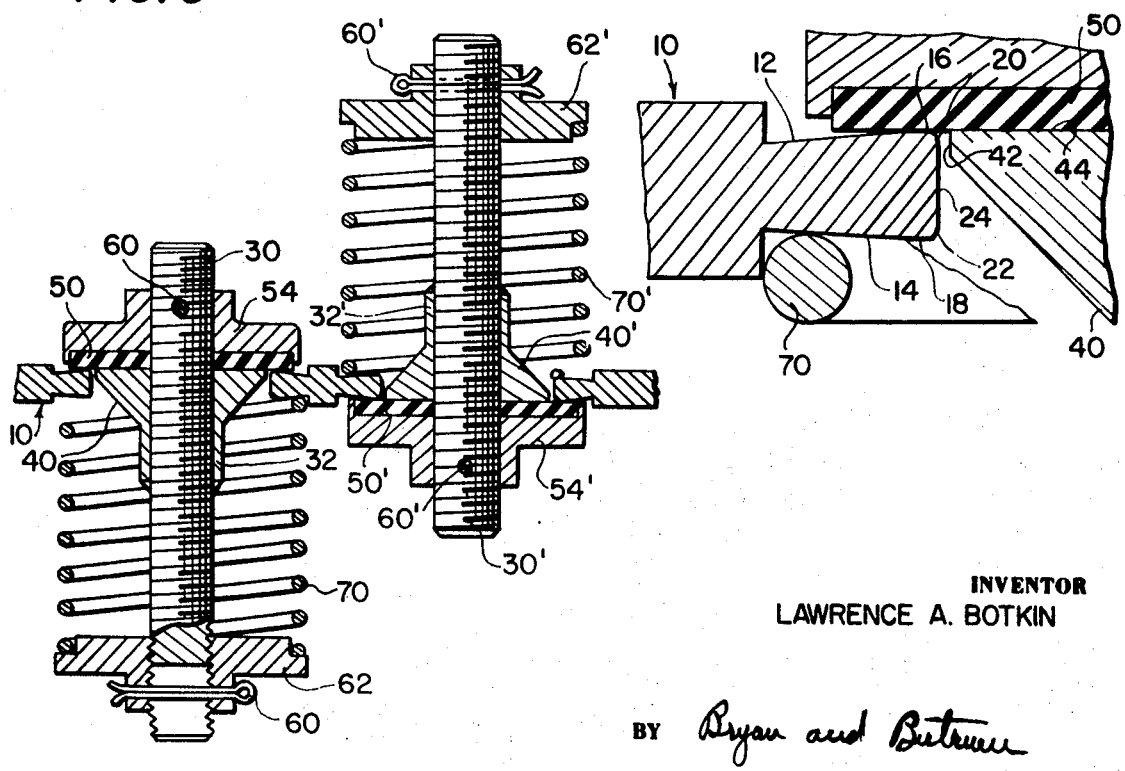
INVENTOR
LAWRENCE A. BOTKIN
BY Bryan and Butmun
ATTORNEYS

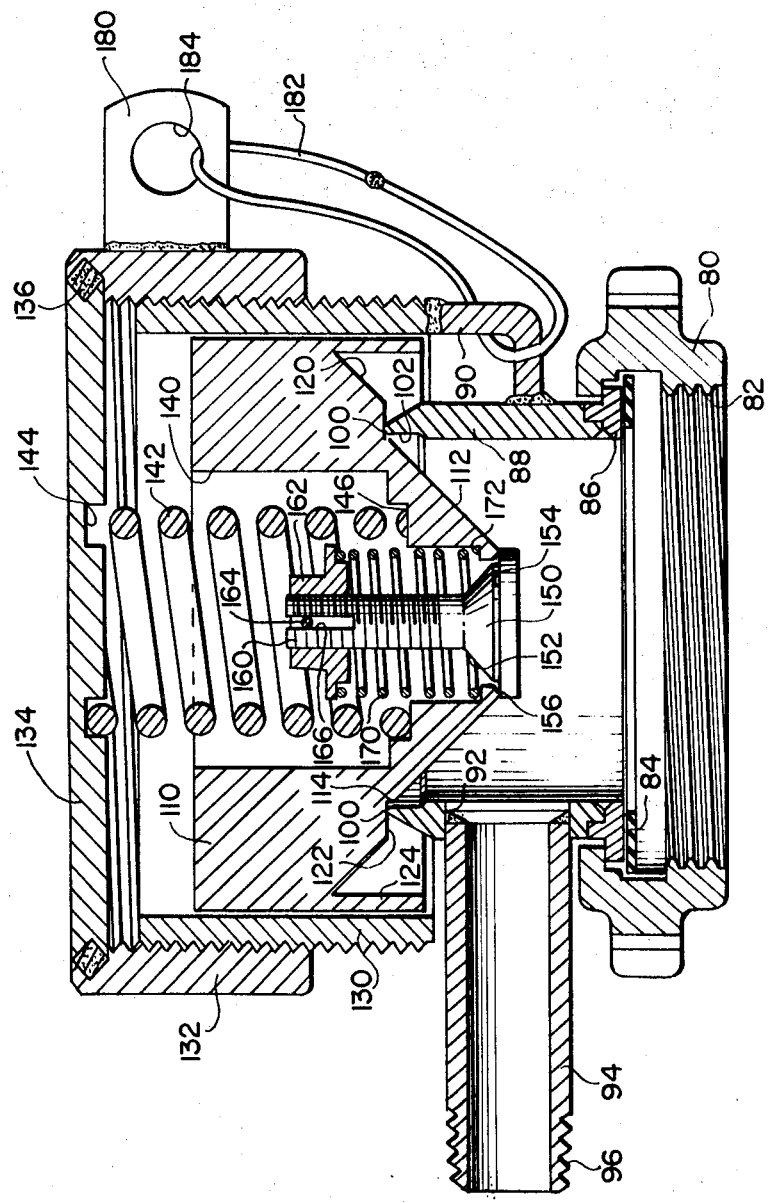

VALVE CONSTRUCTION

BACKGROUND OF THE INVENTION

The present invention relates to a valve construction, and more particularly to a valve construction which is particularly suited for use in relief valves and to provide proper operation thereof. This type of relief valve is especially suited for use with tank containers and chemical trailers of the like.

In conventional pressure relief valves for handling gases or vapors, proper operation is generally assured by employing a diffuser ring arrangement outside of the disc assembly. This type of construction requires close guiding of the poppet assembly within the seat opening of the valve. Such valves are disadvantageous since they are relatively expensive in construction and difficult to maintain. Additionally, this type of valve is likely to clog when handling viscose materials and is thereby prone to failure due to contamination.

SUMMARY OF THE INVENTION

In the present invention, the valve seat means has an opening for receiving the valve and includes a seating surface. A chamfer is formed between the opening and the seating surface and has a predetermined dimension parallel with the axis of movement of the valve means. The valve means itself includes a sealing surface for engaging the seating surface of the valve seat means, and spring means is operatively connected with the valve means for urging the two surfaces into sealing engagement with one another.

The valve means also includes a poppet portion having a tapered surface which joins with a substantially straight cylindrical shoulder fitting closely within the opening defined in the valve seat means and being disposed adjacent to the chamfer on the valve seat means when the valve means is in sealing position. The shoulder has a predetermined dimension in a direction extending substantially parallel with the axis of movement of the valve means which is substantially greater than that of the chamfer, and is preferably at least about two times as great.

The tapered surface on the poppet portion and the fact that the shoulder formed on the poppet portion fits closely within the opening formed in the valve seat means with only very slight clearance with respect thereto assures that the valve means is automatically centered within the valve seat means when the valve means moves to its sealing position. This tapered surface on the poppet portion is preferably substantially frustoconical and helps to direct the flow of discharge gases from the valve assembly so as to obtain optimum lift characteristics under most conditions.

The spring means comprises a stable spring having a relatively large diameter and short length whereby mechanical guiding of the spring is unnecessary. Additional mechanical guiding of the valve means and poppet portion is not required, and accordingly, the valve of the present invention does not have a tendency to clog when handling viscose materials.

Since the shoulder on the poppet portion extends longitudinally substantially beyond the chamfer formed on the valve seat when the valve means is in sealing position, the valve means is accurately centered and held in proper sealing relationship with respect to the associated valve seat means.

Accurate centering of the valve means is important to provide the most effective seal at low pressures. When a resilient sealing surface is provided on the valve means, the valve seat may be provided with a sloping surface and a flat thereon.

The arrangement of the present invention in actual tests has proved to hold bubbletight up to the maximum practical percentage of the set pressure of the valve. The valve also successfully repeats sealing operation thereof at a given pressure due to the accurate centering of the valve means with respect to both the valve seat means and the associated spring means. Misalignment of the valve means either with the seat means or the spring means results in the spring force being improperly centered thereby allowing the valve means to tip and relieve at erratic pressure settings.

It is also most important when considering relief valves to provide a valve which will achieve a rated flow capacity when the pressure is 20 percent in excess of the set pressure. The arrangement of the present invention provides a substantial flow rating at a pressure 20 percent greater than the set pressure. In order to obtain proper operation of the valve means, the relative dimensional relationships of the various parts as set forth hereinafter is extremely important.

The arrangement of the present invention permits ready interchangeability of parts. The parts may be manufactured relatively inexpensively and are of such a nature that they can be dismantled and maintained with common hand tools. The small size and simplified construction of the valve makes it very adaptable for placing in a fitting which incorporates a fusible element.

BRIEF DESCRIPTION OF THE DRAWINGS

FIG. 1 is a vertical section through a first embodiment of a valve according to the present invention;

FIG. 2 is an enlarged view of a portion of the structure shown in FIG. 1;

FIG. 3 is a vertical section through an assembly illustrating a pair of valves disposed in side-by-side relationship; and FIG. 4 is a vertical section through a modified valve assembly according to the present invention.

DESCRIPTION OF THE PREFERRED EMBODIMENTS

Referring now to the drawings wherein like reference characters designate corresponding parts throughout the several views, a first embodiment of the present invention is illustrated in FIGS. 1 and 2. A flange member 10 may be retained in its mounting by a suitable fusible material which may for example fuse at a temperature of about 250° F. A valve seat means is formed in flange member 10, the valve seat means including a pair of seating surfaces 12 and 14 which are tapered at an angle of approximately 5° with respect to the opposite faces of flange member 10.

As seen most clearly in FIG. 2, sloping surfaces 12 and 14 are provided with flats 16 and 18 thereon which are disposed substantially parallel with the opposite faces of flange member 10. Chamfers 20 and 22 are formed between the seating surfaces and a substantially straight cylindrical surface 24 defining an opening for receiving the valve means hereinafter described.

In a typical example wherein the central opening defined by surface 24 may have a diameter of approximately 1.250 inches, the flats 16 and 18 may have a dimension extending parallel with the opposite surfaces of flange member 10 of approximately one thirty-second inch. The chamfers 20 and 22 have a predetermined longitudinal dimension extending substantially parallel with the axis of movement of the associated valve means, or in other words parallel with surface 24 of approximately one sixty-fourth inch.

The valve means includes an elongated substantially cylindrical shaft or stem 30 having external threads formed thereon. A poppet portion 32 has a central threaded bore 34 formed therethrough, this poppet portion being threaded onto the stem as illustrated and being fixed in place by a seal weld 36 extending around the stem.

The poppet portion includes a part 40 having a tapered outer surface of generally frustoconical configuration, this tapered surface being in communication with a shoulder 42 which defines a substantially straight cylindrical surface. This surface 42 is disposed adjacent the chamfer 20 when the valve is in sealing position. Shoulder 42 fits closely within the opening defined by surface 24 and has only a slight clearance with respect thereto. In the aforementioned example, the clearance between the shoulder 40 and surface 42 may be on the order of 0.005 to 0.015 inch. Additionally, this shoulder has a longitudinal dimension extending substantially parallel with the axis of movement of the valve means, or in other words parallel with the axis of stem 30, which is greater than the corresponding dimension of the chamfer 20. In the aforementioned example, this longitudinal dimension of shoulder 42 is approximately one thirty-second inch and accordingly is at least about two times as great as the corresponding dimension of chamfer 20. Chamfer 22 has a longitudinal dimension similar to that of chamfer 20.

The upper surface 44 of the poppet portion engages the undersurface of a resilient gasket member 50. This gasket member may be formed of any suitable resilient sealing substance such as rubber, plastic or the like as desired. Gasket 50 is of annular configuration and includes a central hole 52 receiving the stem 30. The gasket member is received within a complementary recess formed in the undersurface of gasket retainer 54. Retainer 54 has a central threaded bore 56 formed therethrough which receives stem 30, and the gasket retainer is held in the operative position illustrated by a cotter pin 60 extending through suitable aligned holes formed in the gasket retainer and stem.

A spring retainer 62 is provided with a central threaded bore 64 which receives stem 30 of the valve means, the spring retainer being retained in the operative position illustrated by a cotter pin 66 extending through suitable holes provided in spring retainer 62 and a slot 68 provided in he end of the valve stem.

A stable spring 70 is interposed between the spring retainer 62 and the surface 14 of the valve seat means for normally urging the valve means into the sealing position illustrated wherein the sealing surface formed on the underside of gasket 50 is in engagement with the seating of the valve seat means. The stable spring has a relatively large diameter and a short length so that close mechanical guiding of the spring is unnecessary. In a typical example as discussed hereinabove, the spring may comprise a ⅛-inch stainless steel spring having an outer diameter of 1 ⅝ inches and a free height of 3 ¼ inches.

Referring now to FIG. 3 of the drawings, the valve construction of the present invention is illustrated as it may be employed in a vacuum vent assembly. In this construction, the valve means aforedescribed is employed at the left-hand portion of the figure and has been given the same reference numerals. The valve may serve as a relief valve wherein gas may be exhausted from beneath the flange 10 to a point thereabove. At the right-hand side of the figure, a valve construction according to the present invention is illustrated wherein similar parts have been given the same reference numerals primed. This valve means at the right-hand side of this figure serves as a vacuum vent, and it will be noted that the position of the vacuum vent valve means is inverted from that of the pressure relief valve means. It is accordingly apparent that the valve means may be readily inverted for use at either side of an associated valve seat means and will operate equally as well in either position.

Referring now to FIG. 4 of the drawings, a modified form of the invention is illustrated. A swivel base 80 is provided with internal threads 82 for receiving a suitable threaded member. A gasket 84 is also provided for sealing engagement with the upper end of the associated member. A ring member 86 is secured to a base member 88. A plurality of angle clips 90 are secured as by welding to the outer surface of base member 88 and are preferably disposed at equally spaced intervals therearound. The angle clips may be four in number and disposed at 90° intervals with respect to one another.

A hole 92 is drilled through the wall of base member 88 at a point substantially midway between a pair of adjacent angle clips 90 and a nipple 94 is secured in this hole as by welding and the like. The outer end of the nipple is threaded for connection with a suitable means.

The upper end of base member 88 is provided with a valve seat means 100 which is of similar construction to the valve seat means as shown in FIG. 2 except that the upper surface thereof does not slope as does the upper surface 12 of the aforementioned valve seat means. In other words, valve seat means 100 defined at the upper end of base member 88 includes a substantially flat surface extending in a plane perpendicular to the movement of the valve means. An opening for receiving the valve means is defined by surface 102 which is a substantially straight cylindrical surface as is the surface 24 previously described. A chamfer is provided between the seating surface and the opening as in the previously described embodiment.

In this modification, the valve means includes a poppet portion 110 the lower part of which defines a tapered outer surface 112 which is substantially frustoconical in configuration. This tapered surface joins with a shoulder 114 corresponding to the shoulder 42 previously described and which is a substantially straight cylindrical surface. As in the previously described modification, the shoulder 114 has a dimension extending substantially parallel with the axis of movement of the valve means which is at least approximately two times as great as the corresponding dimension of the chamfer formed on the cooperating valve seat means.

As mentioned previously, the frustoconical configuration of the lower part of the poppet portion helps direct the flow of discharge gases to obtain the best lift characteristics under most conditions. In addition, the poppet portion is provided with a further tapered surface 120 which is also substantially frustoconical and which is disposed radially outwardly of the sealing surface 122 formed thereon which cooperates with the seating surface formed on the associated valve seat means. This additional tapered surface 120 further improves the discharge capability of the valve. The outer part of the poppet portion includes a depending skirt portion 124.

A substantially cylindrical pipe nipple 130 is rigidly secured as by welding to the spaced angle clips 90, and is provided with external threads thereon. A generally cylindrical half coupling 132 is provided with internal threads and is threaded onto member 130 as illustrated. Member 132 is inturn rigidly connected with a disclike cap 134 as by welding or by use of a suitable fusible metal element indicated at 136.

Poppet portion 110 is provided with a central hole 140 formed therethrough, this central hole being counterbored to provide a series of shoulders. A stable compression spring 142 has the upper end thereof seated within an annular groove 144 formed in the undersurface of cap 134. The lower end of spring 142 is seated upon a shoulder 146 formed on poppet portion 110 for urging the poppet portion downwardly into the sealing position illustrated.

A valve means is in turn mounted within the central hole provided within poppet portion 110. This valve means includes a poppet portion 150 having a tapered outer surface 152 corresponding to the tapered surface 40 of the previously described modification. The undersurface 154 of the valve means comprises a sealing surface for engaging a seating surface 156 formed at the bottom of poppet portion 110 is surrounding relationship to the central hole formed therethrough. The construction of the cooperating seat portion and poppet portions are identical with that aforedescribed in connection with FIG. 1 in that the seat portion includes a chamfer formed between the seating surface thereof and the surface defining the central opening for receiving the valve means. The poppet portion includes the substantially frustoconical tapered surface joining with a shoulder which is a substantially right cylindrical surface, and the same relative dimensions are employed for ensuring accurate centering of the last-mentioned valve means within the associated valve seat means on poppet portion 110.

A threaded stem 160 extends from poppet portion 150. A spring retainer 162 is mounted on the outer end of the threaded stem portion and is secured in place by cotter pin 164 extending through suitable holes provided in the spring retainer and a slot 166 formed in the end of the stem. A stable spring 170 is interposed between the spring retainer 162 and a shoulder 172 formed on poppet portion 110.

It is readily apparent that the valve mans supported within poppet portion 110 is quite similar in its construction and operation as that described in connection with FIG. 1, and in fact the very same valve means as shown in FIG. 1 can also be supported within the poppet portion 110 of the embodiment shown in FIG. 4 of the drawings.

A sealing clip 180 is secured as by welding to member 132 and extends radially outwardly thereof. A seal wire 182 extends through a hole 184 provided in the sealing clip and extends around one of the angle clips 90.

In the modification illustrated in FIG. 4, the valve incorporates a metal-to-metal seat. The arrangement shown in FIG. 4 may also be employed in a vacuum vent assembly, poppet portion 110 comprising the pressure relief valve means, and poppet portion 150 comprising the vacuum vent valve means.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. A valve construction comprising valve seat means, said valve seat means defining an opening for receiving a valve, said valve seat means also including a seating surface, said valve seat means having a chamfer disposed between said opening and said seating surface, valve means including a sealing surface for engaging said seating surface to provide a seal, said valve means including a poppet portion, spring means operatively connected with said valve means to cause said sealing surface to engage said seating surface, said poppet portion including a tapered surface movable within said opening for centering the valve means, said poppet portion also including a shoulder adjacent said tapered surface, said shoulder when the valve is in sealing position being disposed within said opening and adjacent said chamfer, said opening defined by said valve seat means being formed by a substantially straight cylindrical surface, said shoulder comprising a substantially straight cylindrical surface fitting relatively closely within said opening with only a slight clearance between said two substantially straight cylindrical surfaces, said chamber having a predetermined dimension in a direction parallel with the axis of movement of said valve means, said shoulder having a predetermined dimension in a direction parallel with the axis of said valve means which is at least about two times as great as said dimension of the chamfer, said tapered part of the poppet portion being substantially frustoconical in configuration, said valve means including an elongated valve stem, said poppet portion being fixedly supported on said valve stem, and a spring retainer means supported on said valve stem and engaging said spring means.

2. A valve construction comprising valve seat means, said valve seat means defining an opening for receiving a valve, said valve seat means also including a seating surface, said valve seat means having a chamfer disposed between said opening and said seating surface, valve means including a sealing surface for engaging said seating surface to provide a seal, said valve means including a poppet portion, spring means operatively connected with said valve means to cause said sealing surface to engage said seating surface, said poppet portion including a tapered surface movable within said opening for centering the valve means, said poppet portion also including a shoulder adjacent said tapered surface, said shoulder when the valve is in sealing position being disposed within said opening and adjacent said chamfer, said opening defined by said valve seat means being formed by a substantially straight cylindrical surface, said shoulder comprising a substantially straight cylindrical surface fitting relatively closely within said opening with only a slight clearance between said two substantially straight cylindrical surfaces, said chamfer having a predetermined dimension in a direction parallel with the axis of movement of said valve means, said shoulder having a predetermined dimension in a direction parallel with the axis of said valve means which is at least about two times as great as said dimension of the chamfer, said tapered part of the poppet portion being substantially frustoconical in configuration, a second valve means having a second poppet portion and a second sealing surface, said second poppet portion including a tapered surface for centering the second valve means, a second valve seat means including a second seating surface for engaging said second sealing surface to provide a seal therewith, said first-mentioned sealing surface being formed on said second valve means, said first-mentioned valve means being carried by said second valve means, said second poppet portion having a central opening formed therethrough, said opening receiving said first-mentioned valve means, spring means operatively connected with said second valve means, said spring means being received within said central opening.

3. A valve construction comprising valve seat means, said valve seat means defining an opening for receiving a valve, said valve seat means also including a seating surface, said valve seat means having a chamfer disposed between said opening and said seating surface, valve means including a sealing surface for engaging said seating surface to provide a seal, said valve means including a poppet portion, spring means operatively connected with said valve means to cause said sealing surface to engage said seating surface, said poppet portion including a tapered surface movable within said opening for centering the valve means, said poppet portion also including a shoulder adjacent said tapered surface, said shoulder when the valve is in sealing position being disposed within said opening and adjacent said chamfer, second valve means having a second poppet portion and a second sealing surface, said second poppet portion including a tapered surface for centering the second valve means, a second valve seat means including a second seating surface for engaging said second sealing surface to provide a seal therewith, said first-mentioned seating surface being formed on said second valve means, said first-mentioned valve means being carried by said second valve means, said second poppet portion including a tapered surface extending to a point adjacent said second sealing surface and laterally inwardly thereof, said second poppet portion having a central opening formed therethrough, said opening receiving said first-mentioned valve means, spring means operatively connected with said second valve means, said spring means being received within said central opening.

4. Apparatus as defined in claim 1 wherein said spring means comprises a stable spring.

5. Apparatus as defined in claim 1 wherein the seating surface on said valve seat means slopes relative to a plane extending perpendicular to the axis of movement of said valve means.

6. Apparatus as defined in claim 5 wherein said seating surface includes a flat formed thereon adjacent said chamfer.

7. Apparatus as defined in claim 1 wherein said sealing surface on the valve means comprises a gasket, and gasket retainer means supported on said valve stem and engaging said gasket for holding the gasket in place.

8. Apparatus as defined in claim 3 wherein said second poppet portion includes a second tapered surface formed adjacent to and laterally outwardly of said sealing surface.